(12) United States Patent  
Fornof

(10) Patent No.: US 7,544,234 B2  
(45) Date of Patent: Jun. 9, 2009

(54) VEHICLE AIR SYSTEM HAVING AN INDICATOR DEVICE AND METHOD

(75) Inventor: William P. Fornof, Erie, PA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 590 days.

(21) Appl. No.: 11/346,805

(22) Filed: Jan. 26, 2006

(65) Prior Publication Data

US 2007/0169627 A1     Jul. 26, 2007

(51) Int. Cl.  
*B01D 53/02* (2006.01)

(52) U.S. Cl. .................... 96/117.5; 96/143; 96/147; 55/DIG. 17; 55/DIG. 34; 34/80; 34/89; 34/299

(58) Field of Classification Search ............... 96/108, 96/117.5, 143, 147; 55/DIG. 17, DIG. 34; 34/79, 80, 89, 299  
See application file for complete search history.

(56) References Cited

U.S. PATENT DOCUMENTS

| 3,776,038 | A |  | 12/1973 | Elliott |
| 4,350,508 | A |  | 9/1982 | Santoro et al. |
| 4,487,617 | A |  | 12/1984 | Dienes et al. |
| 4,885,709 | A |  | 12/1989 | Edgar et al. |
| 4,999,035 | A |  | 3/1991 | Warndorf |
| 5,103,576 | A |  | 4/1992 | Cramer et al. |
| 5,171,336 | A |  | 12/1992 | Shulick |
| 5,224,373 | A |  | 7/1993 | Williams et al. |
| 5,427,609 | A | * | 6/1995 | Zoglman et al. ............... 95/98 |
| 6,074,462 | A |  | 6/2000 | Quinn et al. |
| 6,655,315 | B1 |  | 12/2003 | Gattiglia |
| 6,663,679 | B1 |  | 12/2003 | Duncan |
| 6,730,143 | B1 |  | 5/2004 | Nichols et al. |
| 7,285,156 | B2 | * | 10/2007 | Arno et al. ................. 96/117.5 |
| 2003/0056710 | A1 |  | 3/2003 | Radmacher et al. |
| 2004/0141179 | A1 |  | 7/2004 | Fry et al. |
| 2004/0209372 | A1 |  | 10/2004 | Moreton et al. |
| 2005/0106735 | A1 |  | 5/2005 | Song et al. |

* cited by examiner

*Primary Examiner*—Robert A Hopkins  
(74) *Attorney, Agent, or Firm*—Benesch, Frielander, Coplan & Aronoff LLP

(57) ABSTRACT

Various compressed air systems for commercial vehicles are disclosed. In one embodiment, a compressed air system is provided that includes a compressor, an air dryer apparatus, a purge reservoir, and an indicator device. The indicator device comprises a moisture-indicating material that is in contact with the purge air within the purge reservoir.

46 Claims, 3 Drawing Sheets

US 7,544,234 B2

VEHICLE AIR SYSTEM HAVING AN INDICATOR DEVICE AND METHOD

BACKGROUND

This invention relates to vehicle air system, and more specifically to a commercial vehicle air system having a dryer apparatus.

Commercial vehicles such as trucks, buses, and large commercial vehicles are typically equipped with a compressed air system in which the brakes of the vehicle are actuated by compressed air. An air compressor is often operated by the vehicle engine and generates pressurized air for the operation of air brakes and other devices that rely on pneumatic air. However, the operation of an air compressor inherently raises the temperature of the air and also produces contaminants such as oil. The accumulation of water, oil and other contaminants present problems that can adversely affect the operation of the brake system and other devices that rely on the compressed air. More specifically, moisture entrained in the air brake system may during cold weather operation cause the components of the air brake system to freeze, thus rendering the system inoperable.

Vehicle air systems typically include a filter and an air dryer to remove coalesced oil, oil vapor and water vapor of the compressed air. If the dryer is a desiccant dryer, for example, a problem can exist in that once the desiccant is saturated with contamination the dryer ceases to perform the function of providing dry air. It is difficult to know whether the desiccant needs to be replaced, and air dryers can be difficult to service because lines must be disconnected in order to remove the desiccant or desiccant canister. An operator may have to drain air reservoir tanks or perform other mechanical procedures to determine the quality of the air in the system.

Some vehicle air systems further include indicating devices downstream from the dryer to indicate excessive moisture present in the compressed air system. However, there can often be temporary conditions such as excessive demand on the dryer that can affect the quality of the air through the system and therefore yield a false signal with regard to the desiccant. Therefore, a need exists for an air system that addresses the ability to monitor the effectiveness of the desiccant in the dryer.

BRIEF SUMMARY OF THE INVENTION

The present invention provides for a vehicle air system for commercial vehicles that includes an indicator device for monitoring the moisture in the air of the system. In one embodiment the vehicle air system includes a compressor for feeding pressurized air through an air dryer and into a purge reservoir. The purge reservoir includes an indicator device which comprises a moisture-indicating material that changes color based on the humidity of the purge air within the purge reservoir. In an example embodiment the indicator device displays a change in color when the humidity of the purge air is greater than about 10%.

In another embodiment the present invention provides for a dryer apparatus for use in commercial vehicles. The dryer apparatus includes a housing, a desiccant disposed within the housing, a purge reservoir internal to the housing, and an indicator device. The indicator device which includes a moisture-indicating material is in communication with purge air within the purge reservoir.

In another embodiment the present invention provides for a method of monitoring the moisture in the air of a vehicle air system. In one embodiment, the method includes pressurizing a purge reservoir with purge air that exits a dryer apparatus such that the purge air comes in contact with a moisture-indicating material that changes color when the relative humidity of the purge air reaches a predetermined humidity level.

BRIEF DESCRIPTION OF THE SEVERAL VIEWS OF THE DRAWINGS

The various embodiments of the present invention can be understood with reference to the following drawings. The components in the drawings are not necessarily to scale. Also, in the drawings, like reference numerals designate corresponding parts throughout the several views.

DETAILED DESCRIPTION

Figure 1:
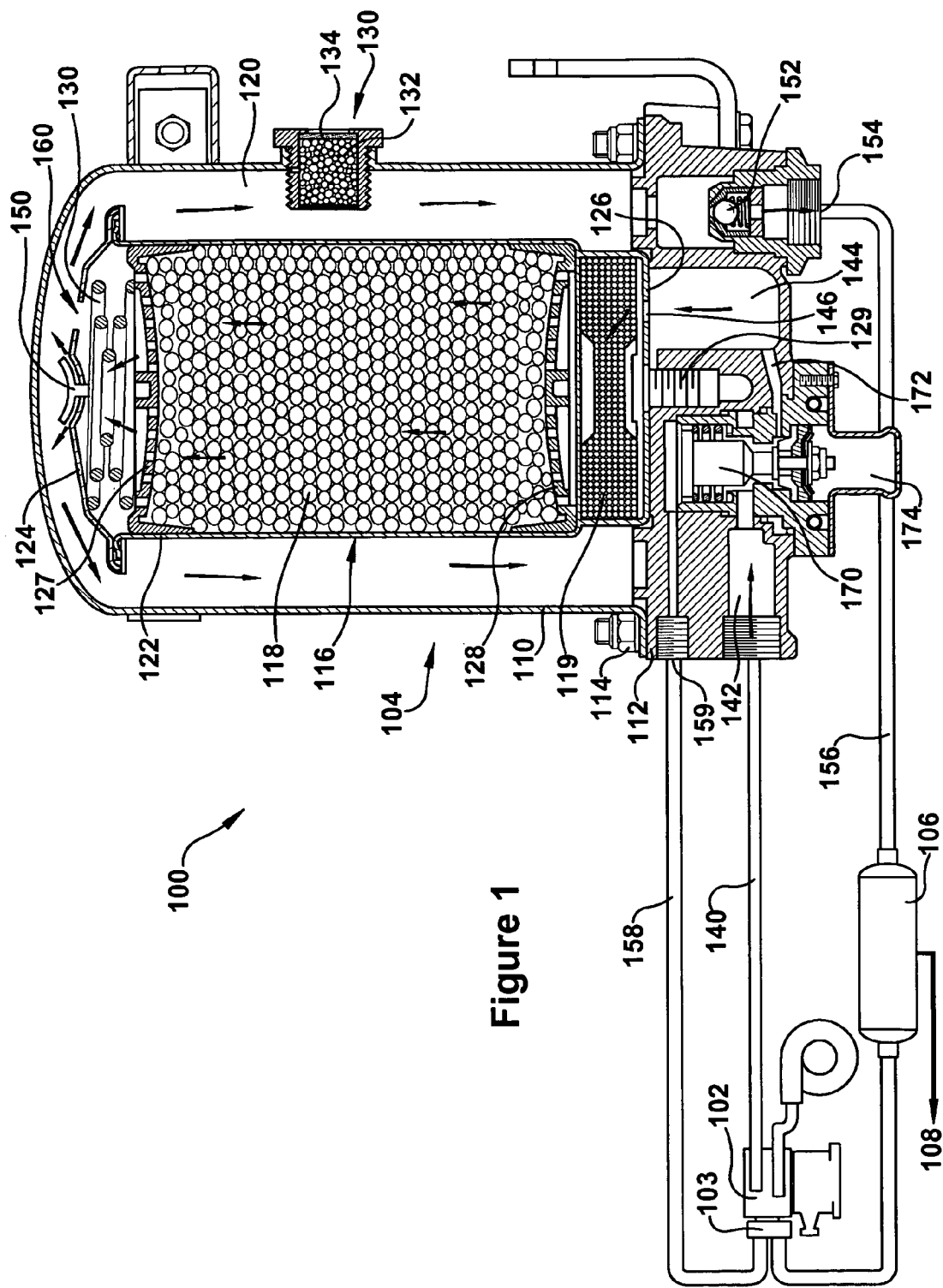
FIG. 1 is a schematic representation of an air drying portion of a commercial vehicle air system having an indicator device mounted on the dryer apparatus, according to an embodiment of the invention.

FIG. 1 illustrates a schematic representation of an air drying portion of a vehicle air system 100. Although the detailed description of this invention describes the invention in specific relation to a compressed air system used in a heavy truck brake system, one skilled in the art should appreciate that the scope of this invention includes compressed air systems used in other vehicles, including other commercial vehicles, to operate brakes as well as other pneumatically-operated devices. An air compressor 102 can be driven by a vehicle engine (not shown) in a conventional manner and controlled by a governor 103. Pressurized air exits the compressor 102 and passes through an air dryer apparatus 104. Moisture, oil and other contaminants are usually removed from the pressurized air before it is stored in supply reservoir 106 or distributed to a downstream use, such as air brakes, and bulk offloading equipment, for example, as represented by reference numeral 108.

Air dryer apparatus 104 includes an air dryer housing 110 secured to end cover 112, for example, by a fastener such as bolt 114. A desiccant cartridge 116, containing desiccant material 118 and a filter 119, is disposed within the dryer housing 104 and cooperates with housing 104 to define a purge reservoir 120 that is internal to the dryer housing 110. The desiccant material 118, which can be for example a beaded desiccant material, removes moisture and other contaminants, such as oil, from the pressurized air which pass through filter 119. The desiccant cartridge 116, as shown, includes a generally circumferential wall 122, end wall 124, and a second end wall 126. Perforated plates 127 and 128 are disposed in the desiccant cartridge 116 and spring 130 maintains pressure on perforated plate 127 so that the desiccant 116 is loaded to inhibit relative movement among the desiccant, for example the desiccant beads. Desiccant cartridge 116 can be secured to the end cover 112 of dryer apparatus 104 by bolt 129 as shown or by some other conventional fastening or attachment means. In this manner, the desiccant cartridge 116 can be installed and removed relative to the end cover 112 by engaging or disengaging bolt 129.

Air system 100 further includes an indicator device 130 and is shown mounted onto the housing of dryer apparatus 104. The indicator device 130 includes a moisture-indicating material 132 that comes into contact with the air within purge reservoir 120. The indicator device 130 functions to provide visual notice via window 134, of a change in color of the moisture-indicating material 132, to prompt one to change desiccant 118 or to prompt action in determining whether the dryer apparatus 104 is functioning properly.

In operation, dryer apparatus 104 operates between a charge cycle and a purge cycle. When the compressor is loaded it is compressing air through compressor discharge line 140 to the supply port 142 of the end cover 112. As air travels through the end cover 112, its direction of flow changes several times, reducing the temperature causing contaminants to condense and drop to the sump cavity 144 of the end cover 112.

After exiting the end cover 112, the air flows into the desiccant cartridge 116 through inlet 146. Once in the desiccant cartridge air first flows through filter 119 which removes water in liquid form as well as oil and solid contaminants and then flows through the column of desiccant 118. The air, which should become progressively dryer through the desiccant 118, then exits the desiccant cartridge 116 through check valve 150 which prevents backflow, and into the purge reservoir 120. Air can also exit the desiccant 118 through purge orifice 160 and into purge reservoir 120. The air within the purge reservoir 120 then flows through check valve 152, delivery port 154, and supply line 156 to the supply reservoir 106 of air system 100. Check valve 152 is shown installed at the delivery port 154 and permits fluid flow from the purge reservoir 120 to the delivery port 154, but prevents flow in the reverse direction.

The dryer apparatus 104 remains in the charge cycle until the pressure builds to a predetermined cutout pressure that can be set on the governor 103. At the cutout pressure, the compressor 102 unloads and air compression is stopped. When the governor 103 unloads the compressor 102, it pressurizes line 158 which connects to the control port 159 of the end cover 112. Purge control valve 170 selectively controls communication between the supply port 142 and the passageway 172 that leads to inlet 146 of desiccant cartridge 116. Specifically, purge control valve 170 can move from a position such that purge exhaust port 174 is closed and communication is permitted between supply port 142 and passageway 172, and an alternative position in which purge exhaust port 174 is open to the atmosphere and communication between supply port 142 and passageway 172 terminated. When purge exhaust port 174 is open to the atmosphere, thereby venting passageway 172 and exhaust port 174 to void contaminants such as water and oil residue that have drained in the sump cavity 144.

During the purge cycle the desiccant 118 can be reactivated by the purge air in the purge reservoir 120. While the purge exhaust port 174 remains open, air stored in the purge reservoir 120 bleeds through the purge orifice 160 to gradually desorb the moisture previously absorbed in the desiccant 118. Check valve 152 prevents compressed air in the supply reservoir 106 from being bled back into the purge reservoir 120 as it is gradually depressurized. Check valve 150 prevents flow of air through the opening end cover 124 to assure that the regeneration of the desiccant 118 will take place at a controlled, even rate by bleeding air through the purge orifice 160. The reduction of the pressure level in the sump cavity 144 also exhausts the compressed air surrounding the desiccant 118, which rapidly depressurizes desiccant cartridge 118, carrying out the moisture, oil droplets and other contaminates entrained on the desiccant material 118 and the filter element 119 through exhaust port 174 to the environment. or to a purge air cleaner (not shown).

The exhaust port 174 can remain open and the pressure within the dryer apparatus 104 can remain reduced until the governor 103 signals the compressor 102 to charge. When the pressure in the supply reservoir 106 drops below a predetermined level caused, for example, by use of the vehicle's air brakes, the compressor 102 again begins to compress air and the signal communicated to the purge control valve 170 is terminated, thereby permitting dryer apparatus 104 to clean and dry the compressed air entering from compressor discharge line 140 and supply port 142.

In another embodiment of the present invention the desiccant cartridge 116 includes indicator device 130. The desiccant cartridge may or may not be a replaceable unit. The indicator device 130 comprises moisture-indicating material 132 that comes into contact with the air within the desiccant cartridge and provides visual notice via window 134 of a change in color of the moisture-indicating material 132. For example, if the desiccant cartridge 116 is replaceable, the desiccant cartridge can be pulled out of the dryer to view the indicator device 130. In another embodiment the indicator device 130 is attached to the wall of the desiccant cartridge 116 and the moisture-indicator material 132 is viewable through the air dryer housing 110, for example, through a window of air dryer (not shown) and through the window 134 of indicator device 130.

Figure 2:
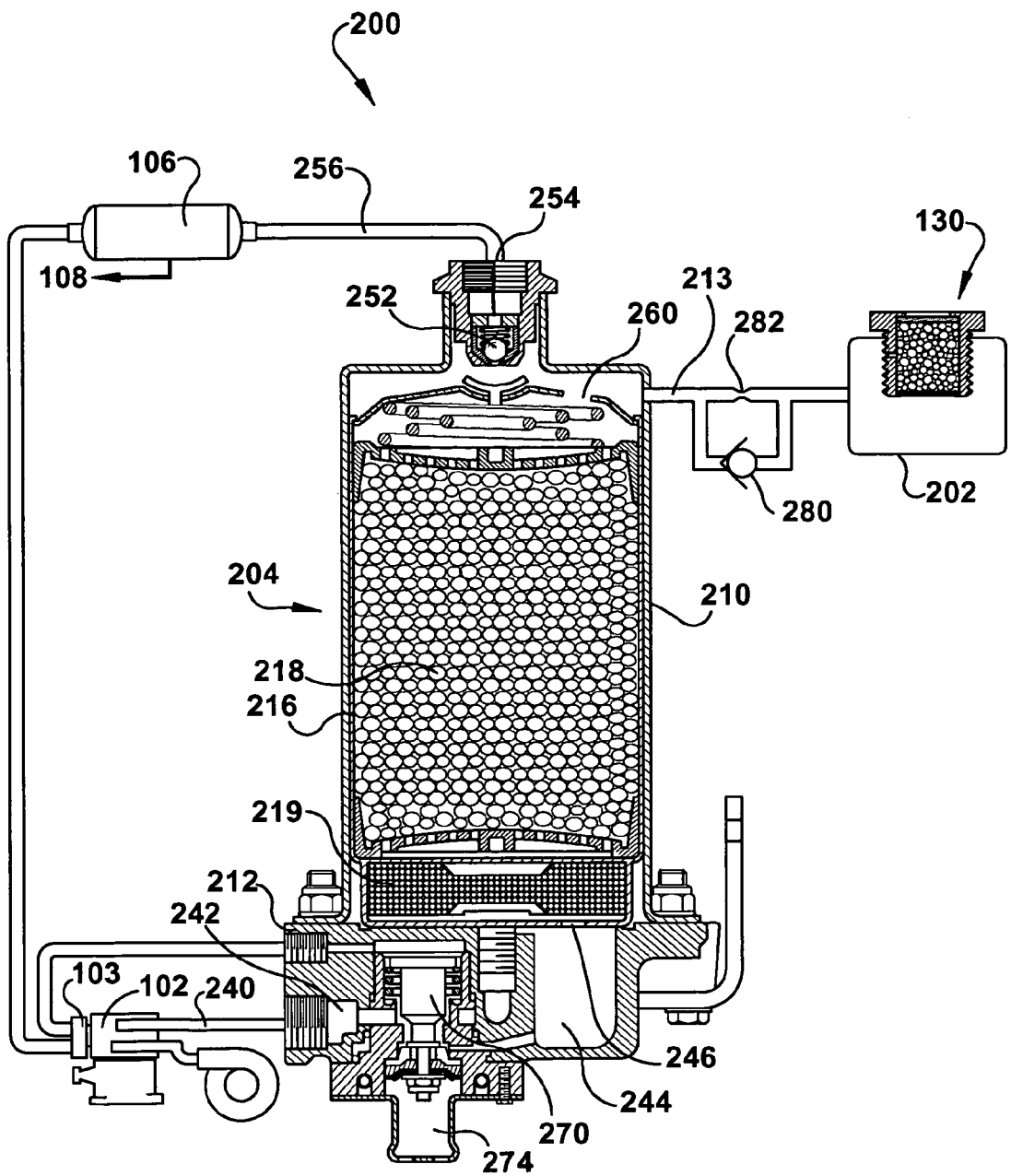
FIG. 2 is a schematic representation of an air drying portion of a commercial vehicle air system having an indicator device remote from the dryer apparatus, according to an embodiment of the invention.

In another embodiment of the invention FIG. 2 shows a schematic representation of an air drying portion of a commercial vehicle air system 200 in which the purge reservoir 202 and indicator device 130 are remote from the dryer apparatus 204. In this example embodiment, the purge reservoir 202 is external to the dryer housing 210 and compressed air passes through desiccant 218 disposed within the dryer housing 210 and through purge line 213 to the purge reservoir 202.

During operation, the charge and purge cycles of commercial vehicle air system 200 is similar to that as described according to the mechanism described above with respect to FIG. 1. Compressed air flows through dryer apparatus 204 via compressor discharge line 240, into supply port 242 of end cover 212, and into the filter 219 and desiccant 218 of desiccant cartridge 216. Compressed air then exits desiccant cartridge 216 through check valve 252, and through delivery port 254 and supply line 256 to supply reservoir 106, and optionally, to other downstream uses as represented by reference numeral 108. Check valve 252 prevents a backflow of air from supply reservoir 106 and supply line 256 through the desiccant 218. The compressed air exiting desiccant 218 can also flow through opening 260 and into purge line 213 to the purge reservoir 202. Check valve 280 allows compressed air to flow into purge reservoir 202 but prevents a backflow of air into the desiccant.

When the compressor 102 unloads and the compression of air is stopped, the purge cycle begins and the purge control valve 270 opens the purge exhaust port 274 to atmosphere. The pressure surrounding the desiccant 116 is reduced while the purge exhaust port 172 remains open, and air stored in the purge reservoir 202 bleeds through orifice 282 and permits restrictive flow, while check valve 280 prevents purge air in from returning to the dryer apparatus 204 in a less controlled manner. Pressurized purge air of the purge reservoir 202 flows through the orifice 282 and through a larger opening 260 of desiccant cartridge 216 to reactivate the desiccant 218. Orifice 282 is sized to allow gradual release of pressure and expansion of purge air to reactivate the desiccant.

In the example embodiments described above with respect to FIGS. 1 and 2, the indicator device 130 is in communication with the purge air located in the purge reservoirs 120, 202. The air in the purge reservoirs 120, 202 may represent the first fraction of compressed air that is passed through desiccant 118 which can tend to be drier and cleaner relative to air downstream in the system, and therefore, can help ensure a more accurate indication of the performance of desiccant 118, 218. In another embodiment, the indicator device can be positioned at a height which is as least as high as about the top one-half of the height of dryer apparatus 104, 204 as shown in FIGS. 1 and 2 above. In such case, with the help of gravity, elevated positioning of the indicator device 130 can avert faulty readings caused by oil that originates, for example, from the lubrication system of the compressor 102 and which passes through the dryer apparatus 104, 204. In the event of oil accumulation in the purge reservoirs 120, 202, the indicator device 130 would tend to be removed from contamination which settles.

In addition, the location or position of indicator device 130 in the purge reservoir 120, 202, where the moisture-indicating material 132 (FIG. 1) is in communication with the purge air, can allow for a more spontaneous and accurate reading of the moisture content of the air once it has exited the dryer apparatus 104, 204. The changing directions of the purge air against the indicator device 130 in purge reservoirs 120, 202, such as for example, a first direction of flow during charging that is opposite a second direction of flow during purging, can provide a more accurate reading of moisture content in the air exiting the dryer apparatus 104, 204, compared to when the indicator device 130 is placed in alternative locations, for example, downstream in a supply line, 156, 256, where the air is moving substantially in a single direction and moisture might reach indicator device 130 primarily via diffusion.

Figure 3:
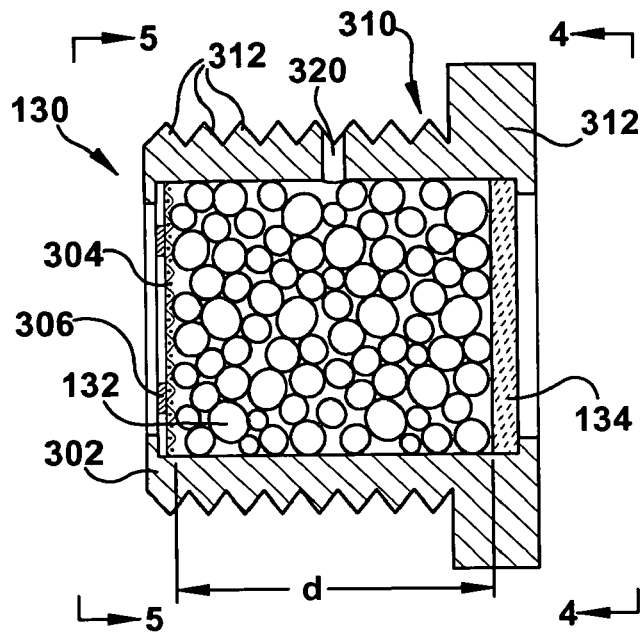
FIG. 3 is a cross-sectional illustration of the indicator device of FIGS. 1 and 2, according to an embodiment of the present invention.

FIG. 3 is a cross-sectional illustration of the indicator device 130 of FIGS. 1 and 2, according to an embodiment of the present invention. Indicator device 130 includes a body 302, moisture-indicating material 132 disposed within body 302, and window 134 for viewing the moisture-indicating material. The indicator device 130 can also include a screen 304 and spring 306 which are mounted within the body 302. The indicator device can also include an o-ring seal (not shown) that rests against shoulder of body 312 and is engaged by the window 134. The indicator device 130 can withstand a pressure of up to about 500 psi.

Figure 4:
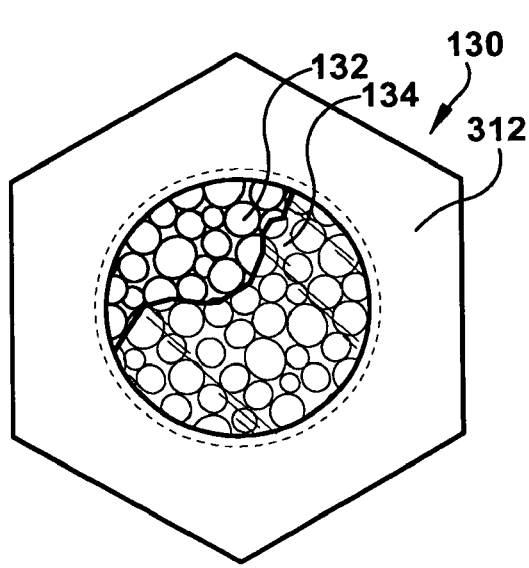
FIG. 4 is a top view of the indicator device taken along lines 4-4 of FIG. 3, according to an embodiment of the invention.

Window 134 can be made of a transparent or translucent material so that the moisture-indicating material 132 is visible. FIG. 4 is a top view of the indicator device take along lines 4-4 of FIG. 3, with the moisture-indicating material 132 shown at the forefront of the window 134. Window 134 may be formed from a glass, vinyl, plastic, acetate, or any transparent or translucent material capable of providing a view adequate to see the color of the moisture-indicating material 132 within the indicator device 130.

In one embodiment of the invention the moisture-indicating material 132 is a hygroscopic material that changes color to a degree that is visible to the human eye when the humidity of the air in which it comes into contact has a relative humidity, RH, of a predetermined value or range, as will be further described. The color change can prompt a user, for example a vehicle operator, to monitor the effectiveness of the dryer apparatus 104, 204, via the condition of the desiccant 118, 218, or rule out other causes for wet air such as excessive demand on the dryer. Particular moisture-indicating materials offer advantages and benefits over others due to their physical properties. These advantages can be primarily due to the humidity threshold at which they absorb moisture and change color, but may also involve some other physical or chemical property, such as performance under various temperature and pressure ranges, corrosiveness, and toxicity, for example. The specific moisture-indicating material 134 used in indicator device 130 can notify the user when a predetermined level or a range of humidity levels of air surrounding the indicator device 130, for example, air in the purge reservoir 120, 202, have been reached or exceeded.

According to the various embodiments of the present invention, the predetermined level or range of humidity levels used to determine the humidity threshold for color change of the moisture-indicating material, can depend at least upon the ambient temperature range in which the vehicle operates and also the differences between the temperature of the air exiting the dryer and the actual ambient temperature. For example, a relative humidity level may be satisfactory in preventing condensation within air system 100, 220, at a particular ambient operating temperature that is relatively high, but the same relative humidity may cause condensation within the air system at an ambient temperature that is relatively low. Therefore, the air system 100, 200, having indicator device 130 of the present invention, includes moisture-indicating material that reliably provides "dry" or "wet" color indication at desired humidity levels for ambient temperature swings in which the vehicle operates.

The moisture-indicating material 134 can be chosen such that it is neither too sensitive nor too resistant to the changes in moisture over the various ambient temperature ranges in which the vehicle may operate. For example, if the moisture-indicating material 134 is too sensitive, and therefore changes to a "wet" color prematurely, the indicator device 130 may signal that the desiccant 118 needs to be replaced even though it is sufficiently effective for drying the air of the vehicle. On the other hand, if the moisture-indicating material 134 is too resistant, and does not change from a "dry" color when moisture in the system is above the predetermined threshold, the indicator device 130 will not signal the user that the air is too wet, thus creating the possibility of condensation downstream which can cause freeze-ups, deterioration of valves, etc. in the vehicle.

Testing which determines the responsiveness of various moisture-indicating materials 134 based on changes in relative humidity, are described in the Examples below. Table I of the Examples shows the calculated dew point temperatures, DPT, and dew point suppression, DPS, at various humidity levels over an ambient temperature range, for example from −30° F. to 80° F., in which a vehicle operates, where the difference between the temperature of the air exiting the dryer (i.e. "dryer outlet temperature") and the "ambient temperature" was, for example, 40° F. The operation of an air compressor of air system 100, 200, inherently raises the temperature of the air, thereby resulting in the different temperatures. Therefore, the temperature of the air which contacts indicator device 130 in the purge reservoir 120 (FIG. 1), 202 (FIG. 2) can be substantially warmer than the ambient temperature of the air in another location of the vehicle air system.

The dew point suppression is the difference between the ambient temperature and the dew point temperature measured as it exits the dryer, at a constant pressure as follows:

$$\text{Dew Point Suppression} = T_{Ambient} - DPT_{Dryer\ Outlet}$$

The Examples below illustrate an example embodiment in which the temperature of the air at the dryer outlet is about 40°

F. warmer than the temperature of the ambient air. Table I shows that the dew point suppression remains less than zero when the relative humidity of air of the purge reservoir is at least about 40%. This indicates that condensation will be present in the system throughout the operating temperature range of about −30° F. to about 80° F. at a relative humidity of at least about 40%. However, when the relative humidity is about 10% or less, the dew point suppression remains greater than zero, and therefore, substantially no condensation will be present in the lines throughout the operating temperature range of about −30° F. to about 80° F.

In the example embodiment having conditions described above with respect to Table I, the indicator maintains its "dry" color until the relative humidity is at least about 10% and the dew point suppression is at least zero. That is, if a moisture-indicating material is too sensitive and changes color at less than about 10% relative humidity, for example, then the indicator will provide warning to the operator that the desiccant should be changed, when in fact it is performing its intended function. On the other hand, if the indicator is insensitive for its intended purpose and does not change to its "wet" color until the relative humidity exceeds about 40%, then the operator will erroneously assume the dryer is functioning properly when condensation is actually present in the lines throughout the operating temperature range.

Table I further shows that where the humidity is greater than about 10% and less than about 40%, the dew point suppression remains positive over various ambient temperature ranges. Therefore, in an example embodiment of the present invention, the moisture-indicating material displays a change in color when the relative humidity of the air in the purge reservoir 120 (FIG. 1), 202 (FIG. 2) is at least about 10%, in another embodiment, when the relative humidity ranges from at least about 10% to about 40%, in an alternative embodiment, from about 15% to about 40%, in another embodiment, from about 15% to about 30%, and in yet another embodiment, from about 20% to about 30%.

In various example embodiments according to the present invention, the moisture-indicating material 132 is a hygroscopic material that changes color to a degree that is visible to the human eye when the dew point suppression, according to one embodiment, is greater than zero, in another embodiment ranges from about 0° F. to about 20° F., in an alternative embodiment, ranges from about 0° F. to about 15° F., in another embodiment ranges from about 2° F. to about 15° F., and in yet another embodiment from about 4° F. to about 12° F.

The above ranges in dew point suppression can apply to air systems in which the temperature difference between the air exiting the dryer (i.e. dryer outlet) and the ambient temperature according to the formula:

$$\Delta T = T_{Dryer\ Outlet} - T_{Ambient}$$

is about 40° F. as shown in Table I. The above ranges in dew point suppression can also apply to air systems ΔT varies. However, for example, if the ΔT is greater than about 40° F. then the truck line may be relatively more susceptible to moisture condensation, and if ΔT is less than about 40° F. then the truck line may be relatively less susceptible to moisture condensation over the same operating temperature range. In one embodiment the ΔT between the dryer outlet air temperature and the ambient air temperature can range from about 20° F. to about 60° F., in an alternative embodiment from about 30° F. to about 50° F., and in yet an alternative embodiment, from about 35° F. to about 45° F.

In another embodiment of the present invention, the moisture-indicating material can revert back to its original color when the relative humidity drops below the predetermined level or range. That is, for example, when the moisture-indicating material 134 changes from a blue color in the "dry" state (e.g. relative humidity is less than about 20%), to a pink color in the "wet" state (e.g. relative humidity reaches about 20%), and then the moisture-indicating material 134 reverts back to the color blue "dry" state (e.g. relative humidity drops below about 20%). The moisture-indicating material 134, is therefore capable of recovering from a wet indication to a dry indication in the purge reservoir. A "wet" color indication may be temporary. When the color of the moisture-indicating material 134 indicates a sustained wet air condition, and excessive demand on the dryer is ruled out, then the user or operator of the vehicle can conclude that the desiccant 118 may be saturated and/or needs to be replaced due to other factors, such as contamination or lack of purge, for example.

Suitable materials that can be used for the moisture-indicating material includes, but is not limited to, hygroscopic materials that are a combination of transition metal found in the Periodic Table and material found in Group 6a and 7a of the Periodic Table. These combinations are normally referred to as metal salts. Examples of metal salts include, but are not limited to, iron salts, for example, iron II salts and iron III salts, for example, iron chloride; copper salts, for example copper chloride; and cobalt salts, for example, cobalt chloride. Metal-salts can have the inherent capability of changing color upon a particular moisture threshold, and organic materials, for example, organic dyes can be combined with metal salts to form organo-metallic salts. For example, organic dyes such as Phenolphthalein, Thymol blue, m-Cresol purple are organic dyes that can be combined with metallic salts to produce a moisture-indicating material. Zorbides can also be used as moisture indicating materials. Hygroscopic materials are hydrophilic due to their affinity for moisture in the atmosphere, which they capture and change color when absorbed.

In another embodiment the moisture-indicating material 134 includes a substrate that is a porous material. That is, the moisture-indicating material can be a hygroscopic material that is coated onto a substrate that has openings, fissure, or voids that can draw air to the moisture-indicating material 134. Suitable substrate materials include, but are not limited to, for example, ceramic, silica gel, alumina, molecular sieve, and cellulose-containing materials, such as for example paper products. A suitable moisture-indicating material 134 that can be used in indicator device 130 disposed within the vehicle air systems of the present invention, for example vehicle air systems 100, 200, is a silica gel substrate coated with iron salt and which is available under the trade name SG31 by Makall Group of Qing Dao, China.

Referring to FIG. 3, a cross-sectional view of indicator device 130 shows that the moisture-indicating material 132 is disposed inside body 310 between the window 134 and a permeable layer 304, for example, a screen, that allows air to contact the moisture-indicating material. The amount of moisture-indicating material disposed in body 302 of indicator device 130 can vary. Also the spontaneity of the color reading as it relates to the actual moisture in the purge reservoir 120, 202, can depend on the depth of the moisture-indicating material 132, d, measured as the distance between the location where the first particles of moisture-indicating material interfaces the purge air, for example at permeable layer 304, and the window 134. The greater the distance d, then the longer it will take for equilibration of particles of moisture-indicating material near window 134. In vehicle air systems 100, 200 of FIGS. 1 and 2 for example, the distance d can be less than about 4 centimeters, in an alternative embodiment less than about 2 centimeters, and in yet another embodiment, d can range from about 0.5 to about 2 centimeters.

As shown in the example embodiment of FIG. 3, extended portion 310 of body 302 of indicator device 130 can include an external threaded region. In this manner, the indicator device can be easily removed 130 from the purge reservoirs 120, 202. The use of a spin-on type arrangement allows the indicator device 130 to be easily removed for inspection, maintenance, or replacement. It should be understood that indicator device 130 can also be attached to purge reservoirs, 120, 202, by a weld, or may be an integral component of the purge reservoir. Indicator device 130 can be provided as original equipment or, in some instances, can be a retrofit arrangement.

In another embodiment the extended portion 310 of body 302 can include an opening 320 through the body, such that when the indicator device 120 is removed, the pressure from the purge reservoirs 120, 202 can be gradually reduced and equilibrated with ambient air pressure before the indicator device 130 is completely removed. This equilibration of air can give an audible signal.

Figure 5:
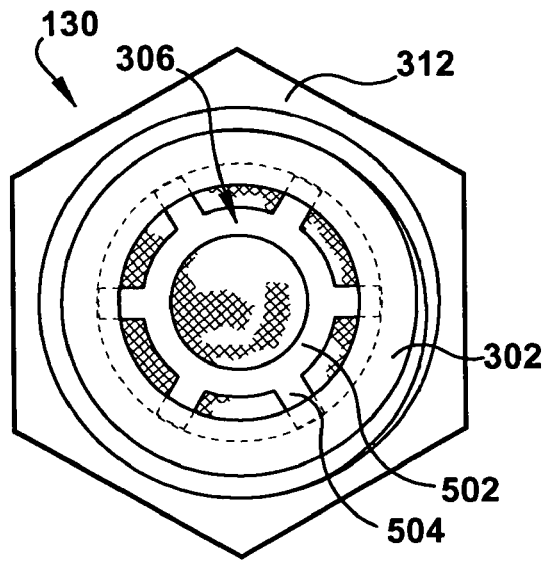
FIG. 5 is a bottom view of the indicator device taken along lines 5-5 of FIG. 4, according to an embodiment of the invention.

FIG. 5 is a bottom view of the indicator device take along lines 5-5 of FIG. 3, according to an embodiment of the invention. Retainer 306, for example, a spring, holds the moisture-indicating material 132 and the permeable layer 304 in place. In the example embodiment shown, retainer 306 includes a ring-shaped body 502 and outwardly directed arms 504. Outer ends of the arms 504 engage internal walls of body 312.

EXAMPLES

The temperature of air at the dryer outlet in a commercial vehicle having a desiccant dryer was measured at various ambient temperatures. The dew point temperatures of the air at the dryer outlet, and the dew point suppression as defined above were calculated at the various humidity levels according to Table I.

The details of the test are as follows: Compressed air of vehicle air system having a pressure that ranged from 110 to 130 psig was circulated through Bendix air dryer AD-9™ having a purge reservoir located internal to the dryer housing. The indicator device was a ½" threaded hex nut filled with SG31 moisture-indicating material by Makall Group of Qing Dao, China, and was screwed into an opening of purge reservoir of the dryer housing. The ambient temperature of the air surrounding the vehicle air system was 70° F., and the temperature of the air exiting the dryer unit was 110° F. The dew point of the air at the outlet of the dryer was measured using a condensation type hygrometer, and the color of the moisture-indicating material was recorded. The volume of air that the dryer processed was increased until the indicator changed color. The above test was repeated using Sorbead™ Orange from Engelhard Corporation of Iselin, New Jersey, as the moisture-indicating material. In addition cobalt chloride was dissolved in solvent and poured in siliga gel to produce another moisture-indicating material, and the above testing was repeated. In all cases, the moisture-indicating material changed color when the dew point suppression ranged from 4° F. to about 12° F.

It will be appreciated that the indicator device and purge reservoir may adopt a wide variety of configurations and be secured to the vehicle air system in a variety of manners. It should be understood that other gases rather than air can be used in the vehicle air system. The present invention is intended to include such modifications and alterations in so far as they fall within the scope of the appended claims or the equivalents thereof.

What is claimed is:

1. A compressed air system for commercial vehicles, the compressed air system comprising:
    a compressor;
    an air dryer comprising a desiccant;
    a purge reservoir comprising an indicator device;
    a delivery port;

TABLE I

| Dryer Outlet Temp ° F. | Ambient Temp ° F. | 5% RH DPT ° F. | 5% RH DPS ° F. | 10% RH DPT ° F. | 10% RH DPS ° F. | 15% RH DPT ° F. | 15% RH DPS ° F. | 20% RH DPT ° F. | 20% RH DPS ° F. | 25% RH DPT ° F. | 25% RH DPS ° F. | 30% RH DPT ° F. | 30% RH DPS ° F. | 40% RH DPT ° F. | 40% RH DPS ° F. |
|---|---|---|---|---|---|---|---|---|---|---|---|---|---|---|---|
| 10 | −30 | −45 | 15 | −34 | 4 | −26 | −4 | −21 | −9 | −17 | 13 | −13 | 17 | −8 | 22 |
| 20 | −20 | −32 | 12 | −25 | 5 | −18 | −2 | −13 | −7 | −8 | 12 | −4 | 16 | 1 | −21 |
| 30 | −10 | −29 | 19 | −17 | 7 | −9 | −1 | −4 | −6 | 1 | −11 | 4 | −14 | 10 | −20 |
| 40 | 0 | −22 | 22 | −10 | 10 | −2 | 2 | 4 | −4 | 8 | −8 | 12 | −12 | 18 | −18 |
| 50 | 10 | −16 | 26 | −3 | 13 | 5 | 5 | 11 | −1 | 16 | −6 | 20 | −10 | 26 | −16 |
| 60 | 20 | −10 | 30 | 4 | 16 | 12 | 8 | 19 | 1 | 24 | −4 | 28 | −8 | 35 | −15 |
| 70 | 30 | −3 | 33 | 11 | 19 | 20 | 10 | 26 | 4 | 32 | −2 | 36 | −6 | 43 | −13 |
| 80 | 40 | 3 | 37 | 17 | 23 | 27 | 13 | 33 | 7 | 39 | 1 | 44 | −4 | 52 | −12 |
| 90 | 50 | 9 | 41 | 24 | 26 | 33 | 17 | 41 | 9 | 47 | 3 | 52 | −2 | 61 | −11 |
| 100 | 60 | 16 | 44 | 31 | 29 | 41 | 19 | 49 | 11 | 55 | 5 | 61 | −1 | 70 | −10 |
| 110 | 70 | 21 | 49 | 38 | 32 | 49 | 21 | 57 | 13 | 64 | 6 | 69 | 1 | 79 | −9 |
| 120 | 80 | 27 | 53 | 45 | 35 | 57 | 23 | 65 | 15 | 72 | 8 | 78 | 2 | 87 | −7 |

Various moisture indicator materials were tested for color change at various levels of moisture according to test method SAE J2384. The moisture-indicating materials tested visibly changed colors when the dew point suppression, as defined by:

$$\text{Dew Point Suppression} = T_{Ambient} - DPT_{Dryer\ Outlet}$$

ranged from 4° F. to about 12° F.

a check valve disposed between the purge reservoir and the delivery port that allows the flow of air from the purge reservoir to the delivery port and prevents flow of air from the delivery port to the purge reservoir; and wherein the indicator device comprises a moisture-indicating material that is in contact with air within the purge reservoir.

2. The compressed air system of claim 1, wherein the air flows from the desiccant of the air dryer into the purge reservoir during a charging cycle and also from the purge reservoir through the desiccant of the air dryer during a purge cycle.

3. The compressed air system of claim 1, wherein the air system further comprises an orifice disposed between the desiccant of the air dryer and the purge reservoir, and the orifice restricts the rate of air flow from the purge reservoir to the air dryer.

4. The compressed air system of claim 3, wherein the air system further comprises a second check valve disposed between the desiccant of the air dryer and the purge reservoir and the check valve allows air flow from the air dryer through the check valve to the purge reservoir, and prevents air flow from the purge reservoir through the check valve to the air dryer.

5. The compressed air system of claim 1, wherein the indicator device comprises a moisture-indicating material capable of visibly changing from a first color to a second color when air in the purge reservoir has a relative humidity level that is greater than about 10%.

6. The compressed air system of claim 5, wherein the air in the purge reservoir has a relative humidity that is less than about 40%.

7. The compressed air system of claim 1, wherein the indicator device comprises a moisture-indicating material capable of visibly changing from a first color to a second color when air in the purge reservoir has a relative humidity level that is greater than about 15% and less than about 30%.

8. The compressed air system of claim 5, wherein the color of moisture-indicating material visibly reverts back to the first color when the relative humidity of the air in the purge reservoir is about 10% or less.

9. The compressed air system of claim 7, wherein the moisture-indicating material visibly changes color when the when dew point suppression of the air, as measured by the ambient air temperature minus the dew point temperature of the air in the purge reservoir, ranges from about 0° F. to about 20° F.

10. The compressed air system of claim 9, wherein the ambient temperature ranges from about −30° F. to about 80° F.

11. The compressed air system of claim 10, wherein the temperature difference, $\Delta T$ between the air at the dryer outlet and the ambient temperature ranges from about 20° F. to about 60° F.

12. The compressed air system of claim 1, wherein the moisture-indicating material visibly changes color when the when dew point suppression is less than about 12° F.

13. The compressed air system of claim 1, wherein the air dryer comprises a dryer housing and the purge reservoir is internal to the dryer housing.

14. The compressed air system of claim 1, wherein the moisture-indicating material comprises a hygroscopic material selected from metal salts comprising transition metal and materials in group 6a and 7a of the Periodic Table, organometallic salts, and mixtures thereof.

15. The compressed air system of claim 14, wherein the moisture-indicating material further comprises a dye.

16. The compressed air system of claim 1, wherein the moisture-indicating material comprises a hygroscopic material selected from iron salts, copper salts, and mixtures thereof.

17. The compressed air system of claim 1, wherein the moisture-indicating material comprises a porous substrate.

18. The compressed air system of claim 17, wherein the porous substrate comprises silica gel.

19. The compressed air system of claim 1, wherein the indicator device comprises:
a body;
a window; and
wherein the moisture-indicating material is disposed inside the body is viewable through the window.

20. The compressed air system of claim 19, wherein the window is transparent.

21. The compressed air system of claim 19, wherein the window is translucent.

22. The compressed air system of claim 19, wherein body comprises a port.

23. The compressed air system of claim 1, wherein:
air flows from the air dryer into the purge reservoir and from the purge reservoir through the desiccant of the air dryer; and
the indicator device comprises a moisture-indicating material that changes color when the relative humidity of the air in the purge reservoir is greater than about 10%.

24. The compressed air system of claim 23, wherein the moisture-indicating material comprises a hygroscopic material selected from metal salts comprising transition metal and materials in group 6a and 7a of the Periodic Table, organometallic salts, and mixtures thereof.

25. A compressed air system for commercial vehicles, the compressed air system comprising:
a compressor;
an air dryer comprising a desiccant;
a purge reservoir comprising an indicator device; and
wherein the indicator device comprises a moisture-indicating material that is in contact with air within the purge reservoir; and
wherein the air dryer comprises a dryer housing and the purge reservoir is external to the dryer housing.

26. The compressed air system of claim 25, wherein the air system further comprises:
a delivery port; and
a check valve disposed between the purge reservoir and the delivery port that allows the flow of air from the purge reservoir to the delivery port and prevents flow of air from the delivery port to the purge reservoir.

27. The compressed air system of claim 26, wherein the air system further comprises:
a second check valve disposed between the desiccant of the air dryer into the purge reservoir and the check valve allows air flow from the air dryer through the check valve to the purge reservoir and prevents air flow from the purge reservoir through the check valve to the air dryer; and
an orifice disposed between the desiccant of the air dryer and the purge reservoir, and the orifice restricts the rate of air flow from the purge reservoir to the air dryer.

28. A compressed air system for commercial vehicles, the compressed air system comprising:
a compressor;
an air dryer comprising a desiccant;
a purge reservoir;
a delivery port;
a check valve disposed between the purge reservoir and the delivery port that allows the flow of air from the purge reservoir to the delivery port and prevents flow of air from the delivery port to the purge reservoir; and
wherein the purge reservoir comprises a means for monitoring the effectiveness of the desiccant of the dryer based on the moisture level of purge air that flows from the air dryer to the purge reservoir and from the purge reservoir to the air dryer.

29. The compressed air system of claim 28, wherein the means for monitoring the moisture level of the purge air comprises a means for viewing a color change from outside the purge reservoir of the vehicle when the moisture level exceeds a predetermined level or range of levels of moisture.

30. The compressed air system of claim 29, wherein the means for viewing a color change from outside the purge reservoir comprises an indicator device comprising a moisture-indicating material disposed inside the body and viewable through a window.

31. The compressed air system of claim 30, wherein the moisture-indicating material comprises a hygroscopic material selected from the group consisting of: iron chloride, copper chloride and mixtures thereof.

32. A dryer apparatus for use in commercial vehicles, the dryer apparatus comprising:
a housing;
desiccant disposed within the housing;
a purge reservoir internal to the housing, the purge reservoir comprising purge air that has passed through the desiccant;
an indicator device comprising moisture-indicating material in communication with the purge air of the purge reservoir;
a delivery port; and
a check valve disposed between the purge reservoir and the delivery port that allows the flow of air from the purge reservoir to the delivery port and prevents flow of air from the delivery port to the purge reservoir.

33. The dryer apparatus of claim 32, wherein the purge reservoir is disposed between a desiccant cartridge containing the desiccant and a wall of the air dryer.

34. The dryer apparatus of claim 32, wherein the air flows from the desiccant of the air dryer into the purge reservoir and also from the purge reservoir through the desiccant of the air dryer such that air flow across the indicator device is in a first direction and a second direction that is opposite the first direction.

35. The dryer apparatus of claim 32, wherein the indicator device comprises a moisture-indicating material capable of visibly changing from a first color to a second color when air in the purge reservoir has a relative humidity level that is greater than about 15% and less than about 30%.

36. The dryer apparatus of claim 35, wherein the color of moisture-indicating material visibly reverts back to the first color when the relative humidity of the air in the purge reservoir is about 15% or less.

37. The dryer apparatus of claim 32, wherein the moisture-indicating material visibly changes color at a dew point suppression that ranges from about 0° F. to about 20° F.

38. The dryer apparatus of claim 37, wherein the ambient temperature ranges from about −30° F. to about 80° F.

39. The dryer apparatus of claim 38, wherein the temperature difference, $\Delta T$ between the air at the dryer outlet and the ambient temperature ranges from about 20° F. to about 60° F.

40. The dryer apparatus of claim 32, wherein the moisture-indicating material comprises a hygroscopic material selected from metal salts comprising transition metal and materials in group 6a and 7a of the Periodic Table, organo-metallic salts and mixtures thereof.

41. The dryer apparatus of claim 32, wherein the indicator device comprises: a body; a window; and wherein the moisture-indicating material is disposed inside the body is viewable through the window.

42. The dryer apparatus of claim 41, wherein the moisture-indicating material comprises a hygroscopic material selected from metal salts comprising transition metal and materials in group 6a and 7a of the Periodic Table, organo-metallic salts, and mixtures thereof.

43. A method of monitoring the moisture in the air of a vehicle air system, the method comprising:
pressurizing a purge reservoir with purge air that has passed through a desiccant and passing the purge air into contact with a moisture-indicating material;
depressurizing the purge reservoir and passing the purge air from the purge reservoir into contact with the desiccant.

44. The method of claim 43, wherein the moisture-indicating material comprises a hygroscopic material selected from metal salts comprising transition metal and materials in group 6a and 7a of the Periodic Table, organo-metallic salts and mixtures thereof.

45. A compressed air system for commercial vehicles, the compressed air system comprising:
a compressor;
a dryer apparatus;
desiccant disposed within the dryer apparatus;
a purge reservoir internal to the housing to receive purge air that has passed through the desiccant;
an indicator device comprising moisture-indicating material in communication with the purge air of the purge reservoir and
wherein the indicator device comprises a moisture-indicating material that visibly changes from a first color to a second color when air in the purge reservoir has a relative humidity level that is greater than about 15% and less than about 30.

46. The compressed air system of claim 45, wherein:
the moisture-indicating material visibly changes color when the when dew point suppression of the air, as measured by the ambient air temperature minus the dew point temperature of the air in the purge reservoir, ranges from about 0° F. to about 20° F.; and the ambient temperature ranges from about −30° F. to about 80° F.

* * * * *